United States Patent
Chung et al.

(10) Patent No.: US 10,001,807 B2
(45) Date of Patent: Jun. 19, 2018

(54) COMPUTING DEVICE AND COMPUTING SYSTEM USING SAME

(71) Applicant: HCS AUDIO TECHNOLOGY LIMITED, Shatin (HK)

(72) Inventors: Chul Chung, Hong Kong (HK); Li-Ting Cai, Houston, TX (US)

(73) Assignee: HCS AUDIO TECHNOLOGY LIMITED, Shatin (HK)

( * ) Notice: Subject to any disclaimer, the term of this patent is extended or adjusted under 35 U.S.C. 154(b) by 0 days. days.

(21) Appl. No.: 15/341,203

(22) Filed: Nov. 2, 2016

(65) Prior Publication Data

US 2017/0123456 A1     May 4, 2017

Related U.S. Application Data

(60) Provisional application No. 62/249,959, filed on Nov. 3, 2015.

(51) Int. Cl.
| | |
|---|---|
| *G06F 1/16* | (2006.01) |
| *G06F 1/20* | (2006.01) |
| *G06F 13/40* | (2006.01) |
| *G06F 13/38* | (2006.01) |

(52) U.S. Cl.
CPC .......... *G06F 1/1632* (2013.01); *G06F 1/1616* (2013.01); *G06F 1/1637* (2013.01); *G06F 1/1698* (2013.01); *G06F 1/203* (2013.01); *G06F 13/385* (2013.01); *G06F 13/4081* (2013.01)

(58) Field of Classification Search
CPC .................................................... G06F 1/1632
See application file for complete search history.

(56) References Cited

U.S. PATENT DOCUMENTS

| | | | |
|---|---|---|---|
| 6,489,932 B1* | 12/2002 | Chitturi | G06F 1/1601 345/173 |
| 7,054,965 B2* | 5/2006 | Bell | G06F 1/1626 345/1.1 |
| 9,152,582 B2* | 10/2015 | Reeves | G06F 13/14 |
| 9,760,523 B2* | 9/2017 | Gu | G06F 13/4252 |
| 2003/0126335 A1* | 7/2003 | Silvester | G06F 1/1626 710/303 |
| 2004/0019724 A1* | 1/2004 | Singleton, Jr. | G06F 1/1616 710/303 |
| 2005/0185364 A1* | 8/2005 | Bell | G06F 1/1632 361/679.41 |
| 2008/0270665 A1* | 10/2008 | Senatori | G06F 1/1616 710/303 |
| 2008/0273015 A1* | 11/2008 | Huang | G06F 3/0416 345/173 |

(Continued)

*Primary Examiner* — Anthony Q Edwards
(74) *Attorney, Agent, or Firm* — ScienBiziP, P.C.

(57) ABSTRACT

A computing system includes a docking station and a computing device. The docking station includes a first connector. The computing device includes a second connector, a processor, a storage unit, and a wireless communication unit. The second connector, the storage unit, and the wireless communication unit are coupled to the processor. The second connector is detachably and electrically coupled to the first connector of the docking station. The computing device is configured to transmit content to the docking station for display by the first and second connectors. Thus, the computing system has advantages of mobility and operability.

19 Claims, 10 Drawing Sheets

(56) References Cited

U.S. PATENT DOCUMENTS

| | | | |
|---|---|---|---|
| 2010/0246119 A1* | 9/2010 | Collopy | G06F 1/1616 361/679.55 |
| 2012/0011293 A1* | 1/2012 | Cheng | G06F 1/1632 710/303 |
| 2012/0054401 A1* | 3/2012 | Cheng | G06F 1/1632 710/304 |
| 2012/0084542 A1* | 4/2012 | Reeves | G06F 13/14 713/1 |
| 2013/0007301 A1* | 1/2013 | Jung | G06F 1/1632 710/5 |
| 2013/0073769 A1* | 3/2013 | Peng | G06F 1/1632 710/303 |
| 2013/0172055 A1* | 7/2013 | Han | G06F 1/1626 455/566 |
| 2014/0181347 A1* | 6/2014 | Hamel | G06F 13/4081 710/304 |
| 2014/0342669 A1* | 11/2014 | Zeung | H04M 1/7253 455/41.2 |
| 2015/0138094 A1* | 5/2015 | Kim | G06F 1/1632 345/168 |
| 2015/0356045 A1* | 12/2015 | Soffer | G06F 13/4221 710/303 |
| 2016/0050375 A1* | 2/2016 | Soffer | H04N 5/268 348/445 |
| 2016/0275773 A1* | 9/2016 | Dharmadhikari | H01R 13/00 |
| 2016/0378704 A1* | 12/2016 | Adamson | G06F 13/364 710/104 |
| 2017/0102736 A1* | 4/2017 | Peng | G06F 1/1632 |
| 2017/0230453 A1* | 8/2017 | Verma | H04L 67/1095 |
| 2017/0255272 A1* | 9/2017 | Flagg | G06F 3/017 |
| 2017/0272681 A1* | 9/2017 | Oh | G08C 17/02 |

\* cited by examiner

COMPUTING DEVICE AND COMPUTING SYSTEM USING SAME

CROSS REFERENCE TO RELATED APPLICATION

This application claims priority from U.S. Provisional Patent Application Ser. No. 62/249,959, filed Nov. 3, 2015.

FIELD

The subject matter herein generally relates to computing devices and computing systems using the same.

BACKGROUND

There exist two main types of computing platforms, personal computers and mobile devices. A personal computer includes a processor a display monitor, and a keyboard. A mobile device includes a processor and an I/O device such as a touch screen. In terms of performance, operability, and visual display, the personal computer excels when compared to a mobile device. However, a mobile device is better in terms of portability and accessibility. Therefore, in comparing the applicability and functionality of the respective platforms, there exists a problem where a trade-off is necessary between mobility and operability.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

Figure 1:
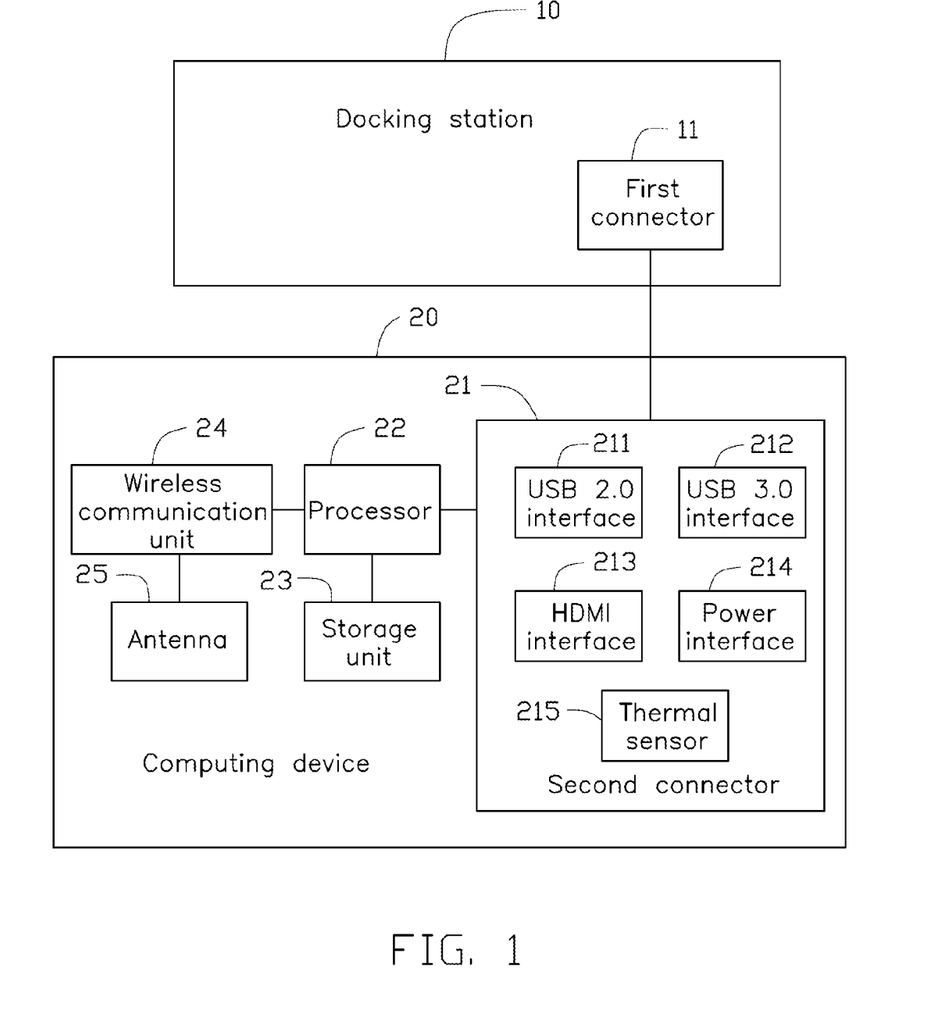
FIG. 1 is a block diagram of a first exemplary embodiment of a computing system.
Figure 2:
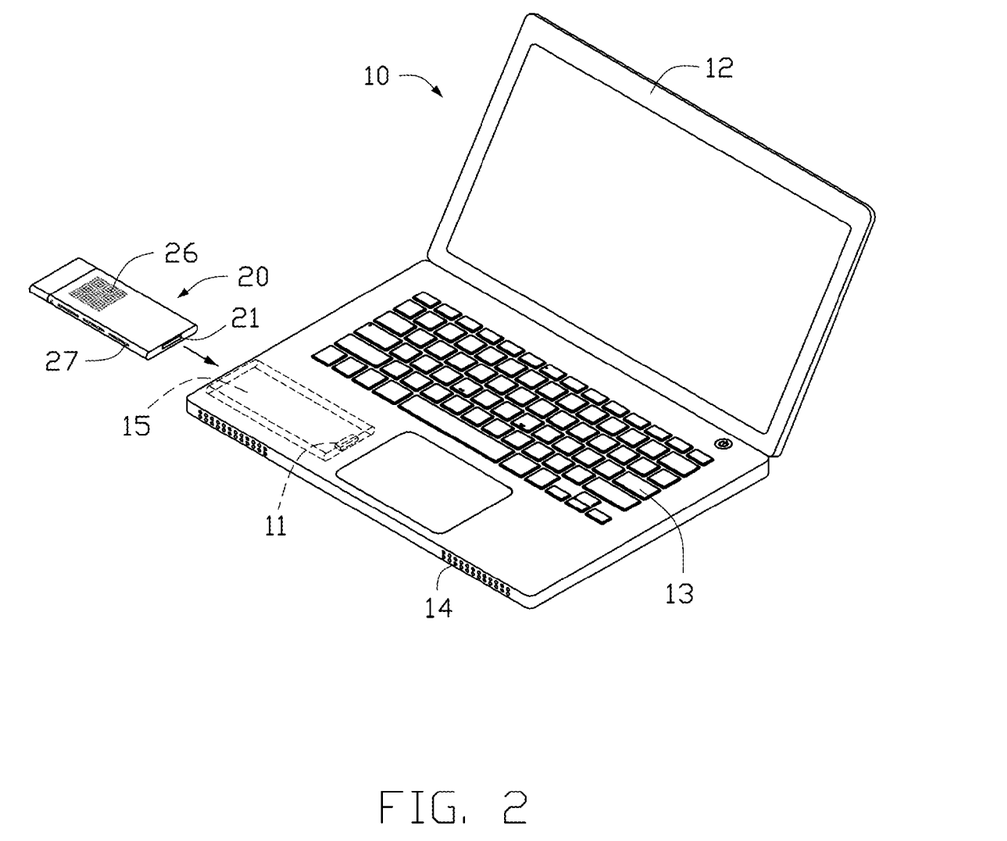
FIG. 2 is a schematic perspective view of the computing system of FIG. 1, showing a docking station being a notebook-like device.
Figure 3:
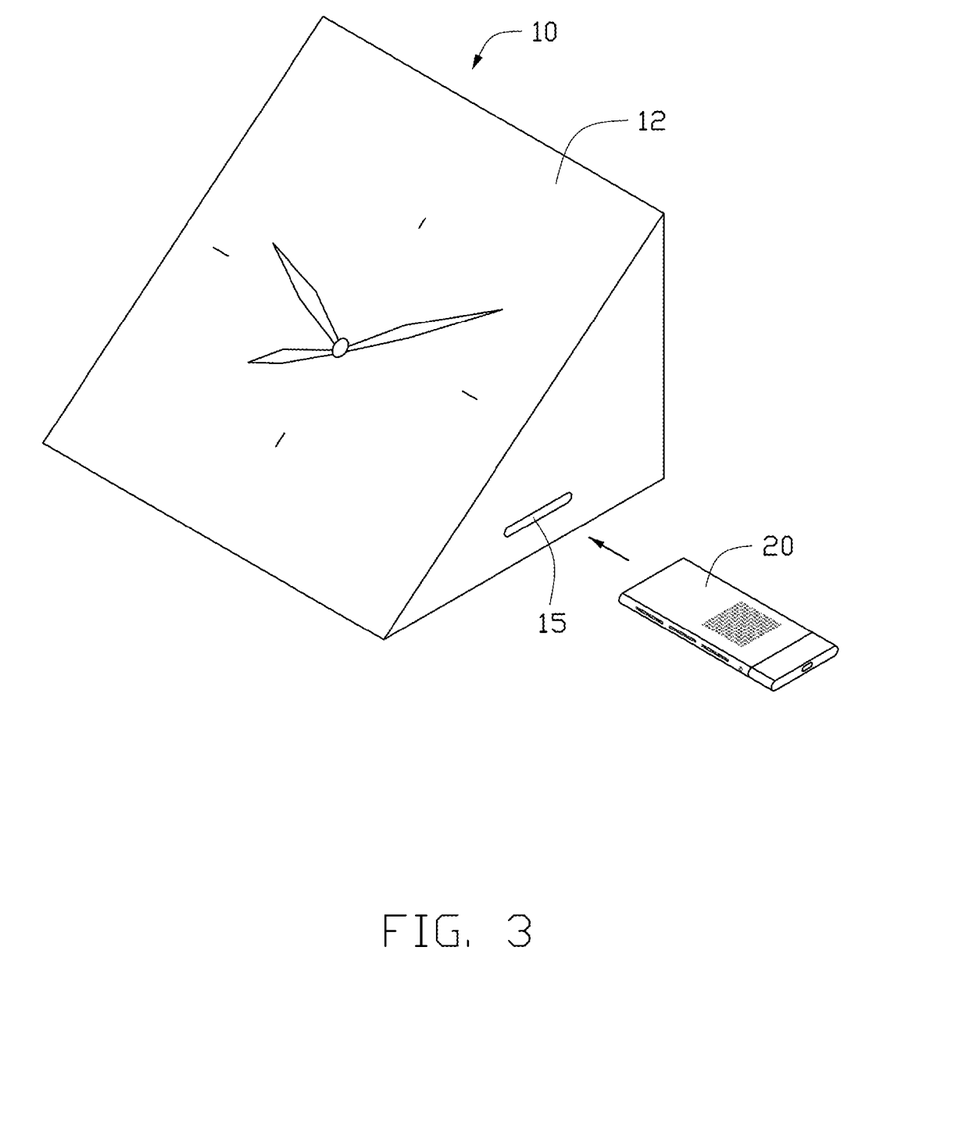
FIG. 3 is a schematic perspective view of the computing system of FIG. 1, showing a docking station being an electronic display device.

FIGS. 1-3 illustrate a first exemplary embodiment of a computing system. Referring to FIG. 1, in the first exemplary embodiment, the computing system includes a docking station 10 and a computing device 20. The docking station 10 may be a notebook-like device, a refrigeration device or other electronic devices. The docking station 10 includes a first connector 11.

The computing device 20 includes a second connector 21, a processor 22, a storage unit 23, and a wireless communication unit 24. The second connector 21, the storage unit 23, and the wireless communication unit 24 are connected to the processor 22. The computing device 20 is configured to transmit content to the docking station 10 for display through the first and second connectors 11, 21.

The second connector 21 includes a USB 2.0 interface 211, a USB 3.0 interface 212, a HDMI interface 213, a power interface 214, and a thermal sensor 215. The first and second connectors 11, 21 are male and female connectors, and may be 40-pin connectors, may be wired interfaces such as USB Type-C interfaces, USB 2.0 interfaces, USB 3.0 interfaces, HDMI interfaces, MHL interfaces and DP interfaces, or may be wireless interfaces such as Miracast interfaces. The second connector 21 is detachably and electrically coupled to the first connector 11 of the docking station 10.

The processor 22 processes data for the computing device 20. The processor 22 may be any type processor, such as Intel's Cherry Trail processor or Qualcomm's Snapdragon processor, and so on.

The storage unit 23 includes a memory (not shown), a mass data storage (not shown), and a memory card (not shown). The memory works with the processor 22 to provisionally store data for the processor 22. The mass data storage works as a hard disk drive to store mass data therein. The memory card, such as a micro SD card, works as an auxiliary storage for data.

The wireless communication unit 24 is connected to an antenna 25. The wireless communication unit 24 is used to provide a wireless communication mode for the computing device 20. The wireless communication unit 24 may be a WiFi unit, a Bluetooth unit, or a combination unit combining a WiFi unit and a Bluetooth unit.

FIG. 2 illustrates the docking station 10 being a notebook-like device. The docking station 10 further includes a display 12, a keyboard 13, a speaker 14, a slot 15, and a plurality of I/O ports (not shown). The first connector 11 is mounted within the slot 15. The slot 15 is configured for receiving the computing device 20. The computing device 20 further includes heat vents 26 and a memory card slot 27. The memory card slot 27 is configured for receiving the memory card. The computing device 20 may further includes a cooling device, such as a cooling fan (not shown). An application is installed in the computing device 20 and the computing device 20 is coupled to the docking station 10 through the first and second connectors 11, 21. The display 12 of the docking station 10 can display information of the application. The computing system can be controlled by inputting signals on the docking station 10, such as pressing the keyboard 13 of the docking station 10 or touching the display 12 of the docking station 10.

FIG. 3 illustrates the docking station 10 being an electronic display device. The docking station 10 further includes a slot 15. The slot 15 is configured for receiving the computing device 20. An application is installed in the computing device 20 and the computing device 20 is coupled to the docking station 10. The display 12 of the docking station 10 can display information of the application. The computing system can be controlled by inputting signals on the docking station 10, such as touching the display 12 of the docking station 10. In use, a cooking application is installed in the computing device 20 such that the display 12 of the docking station 10 displays cooking recipe, or a weather application is installed in the computing device 20 such that the display 12 of the docking station 10 displays weather report.

Figure 4:
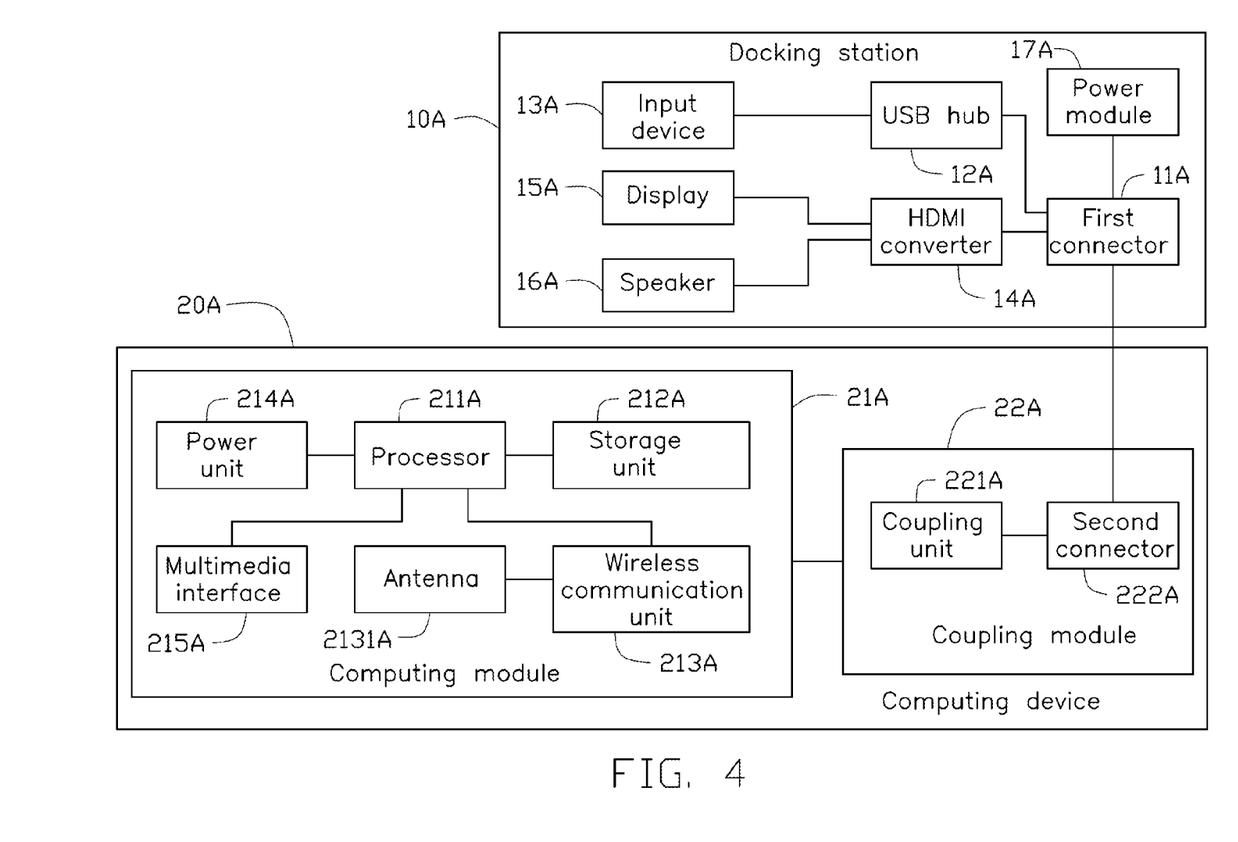
FIG. 4 is a block diagram of a second exemplary embodiment of a computing system.
Figure 5:
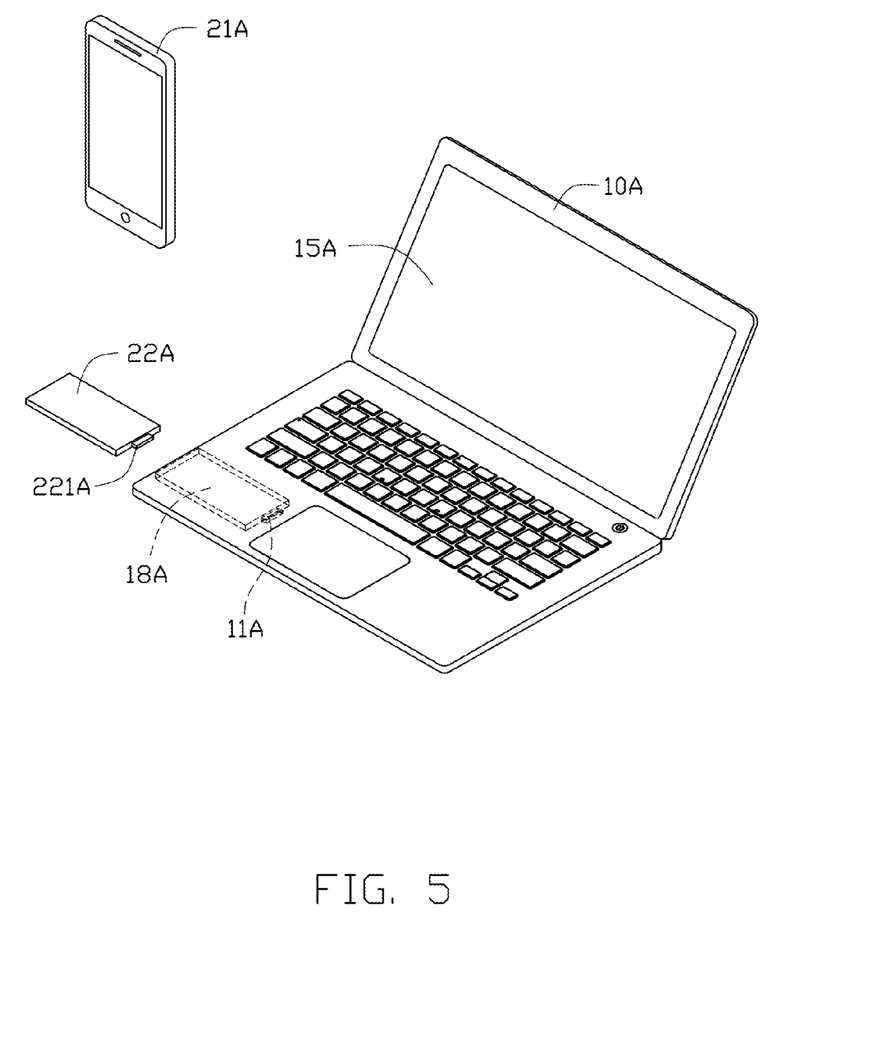
FIG. 5 is a schematic perspective view of the computing system of FIG. 4 showing a docking station being a notebook-like device.

FIGS. 4-5 illustrate a second exemplary embodiment of a computing system. Referring to FIG. 4, in the second exemplary embodiment, the computing system includes a docking station 10A and a computing device 20A. The docking station 10A may be a notebook-like device or other electronic display devices. The docking station 10A includes a first connector 11A, a USB hub 12A, an input device 13A, a HDMI converter 14A, a display 15A, a speaker 16A and a power module 17A. The USB hub 12A is connected to the first connector 11A. The input device 13A, such as a keyboard, a trackpad, or a mouse, can be built-in or external and is connected to the USB hub 12A. The HDMI converter 14A is connected to the first connector 11A. The display 15A and the speaker 16A are connected to the HDMI converter 14A. The HDMI converter 14A is configured to convert the HDMI signals from the first connector 11A to video signals to the display 15A and audio signals to the speaker 16A. The power module 17A is connected to the first connector 11A. The power module 17A may include a battery or a charger by a DC-in interface.

The computing device 20A includes a computing module 21A and a coupling module 22A. The computing module 21A may be a mobile phone or other mobile communication devices. The computing module 21A includes a processor 211A, a storage unit 212A, a wireless communication unit 213A, a power unit 214A, and a multimedia interface 215A. The storage unit 212A, the wireless communication unit 213A, the power unit 214A, and the multimedia interface 215A are connected to the processor 211A. The processor 211A processes data for the computing module 21A. The storage unit 212A includes a memory (not shown), a mass data storage (not shown), and a memory card (not shown). The wireless communication unit 213A is connected to an antenna 2131A and is used to provide a wireless communication mode for the computing module 21A. The power unit 214A receives power externally and provides power to the computing module 21A. The multimedia interface 215A may be a wired interface such as a USB Type C interface, a HDMI interface, MHL interface and DP interface.

The coupling module 22A includes a coupling unit 221A and a second connector 222A. The coupling unit 221A is connected to the second connector 222A. The coupling unit 221A may be different types corresponding to the type of the multimedia interface 215A. The computing module 21A is coupled to the coupling module 22A by the multimedia interface 215A and the coupling unit 221A or/and the wireless communication unit 213A. The second connector 222A is detachably and electrically coupled to the first connector 11A of the docking station 10A.

The docking station 10A can be coupled to any computing module 21A by choosing a corresponding coupling module 22A. Multimedia signals are sent from the computing module 21A to the docking station 10A in sequence by the multimedia interface 215A, the coupling unit 221A, the second connector 222A, and the first connector 11A. The input device 13A is coupled to the processor 211A in sequence by the USB hub 12A, the first connector 11A, the second connector 222A, the coupling unit 221A, and the multimedia interface 215A. The input device 13A is configured to operate the computing module 21A.

FIG. 5 illustrates the docking station 10A being a notebook-like device and the computing module 21A is a mobile phone. The docking station 10A further includes a slot 18A and the first connector 11A is mounted within the slot 18A. The slot 18A is configured for receiving the coupling module 22A. An application is installed in the computing module 21A and the coupling module 22A is coupled to the docking station 10A through the first and second connectors 11A, 222A. The display 15A of the docking station 10A can display information of the application.

Figure 6:
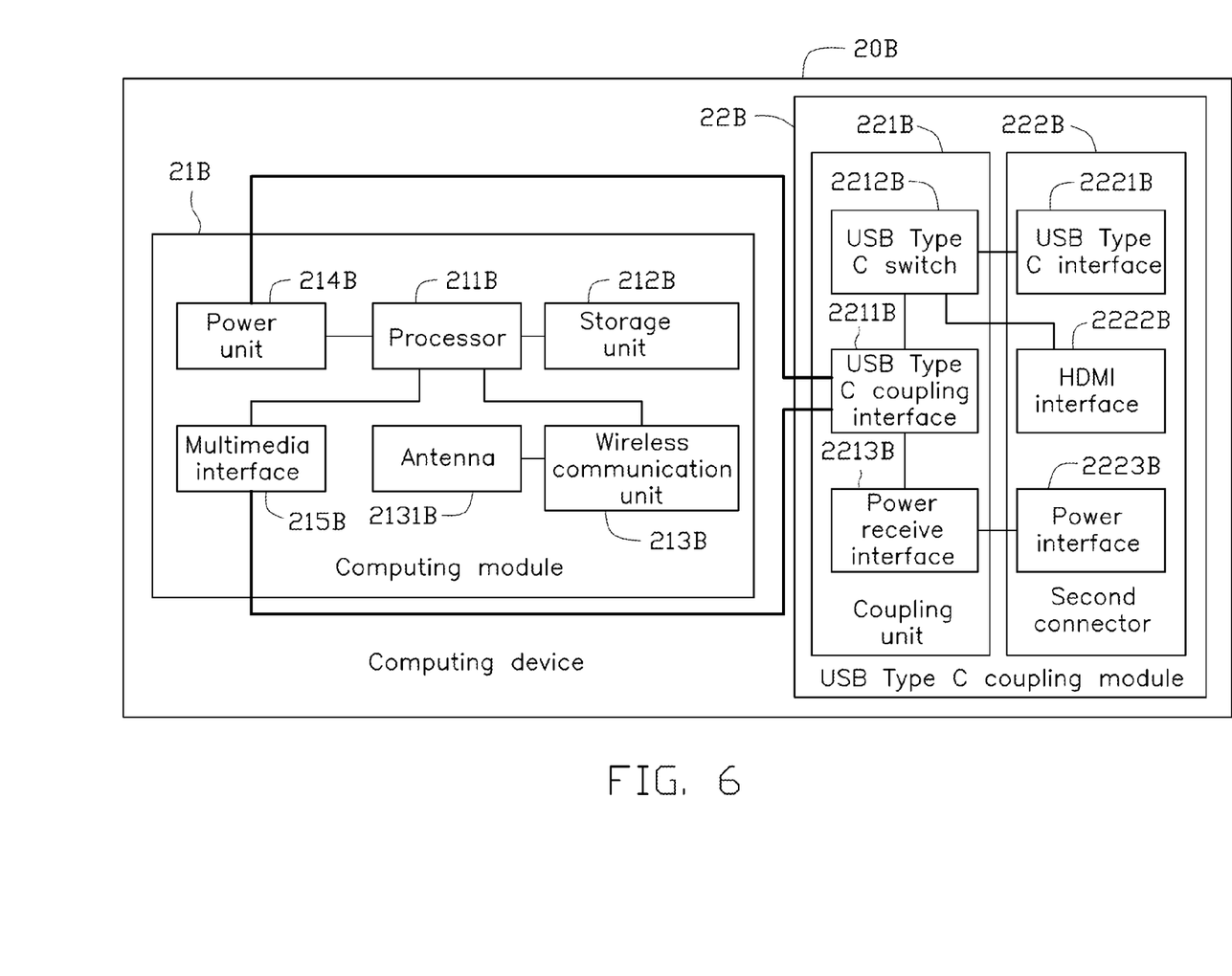
FIGS. 6-10 are block diagrams of alternative exemplary embodiments of a computing device of the computing system of FIG. 4.

FIGS. 6-10 are block diagrams of alternative exemplary embodiments of the coupling module 22B, 22C, 22D, 22E, 22F. Referring to FIG. 6, the coupling module 22B is a USB Type C coupling module corresponding to the computing module 21B with the USB Type C multimedia interface 215B. The coupling unit 221B includes a USB Type C coupling interface 2211B, a USB Type C switch 2212B, and a power receive interface 2213B. The USB Type C switch 2212B and the power receive interface 2213B are connected to the USB Type C coupling interface 2211B. The USB Type C coupling interface 2211B is couplable to the USB Type C multimedia interface 215B and the power unit 214B. The second connector 222B includes a USB type C interface 2221B, a HDMI interface 2222B, and a power interface 2223B. The USB type C interface 2221B and the HDMI interface 2222B are connected to the USB Type C switch 2212B such that the input device 13A is coupled to the processor 211B in sequence by the USB Type C switch 2212B, the USB Type C coupling interface 2211B, and the USB Type C multimedia interface 215B. The power interface 2223B is connected to the power receive interface 2213B.

Figure 7:
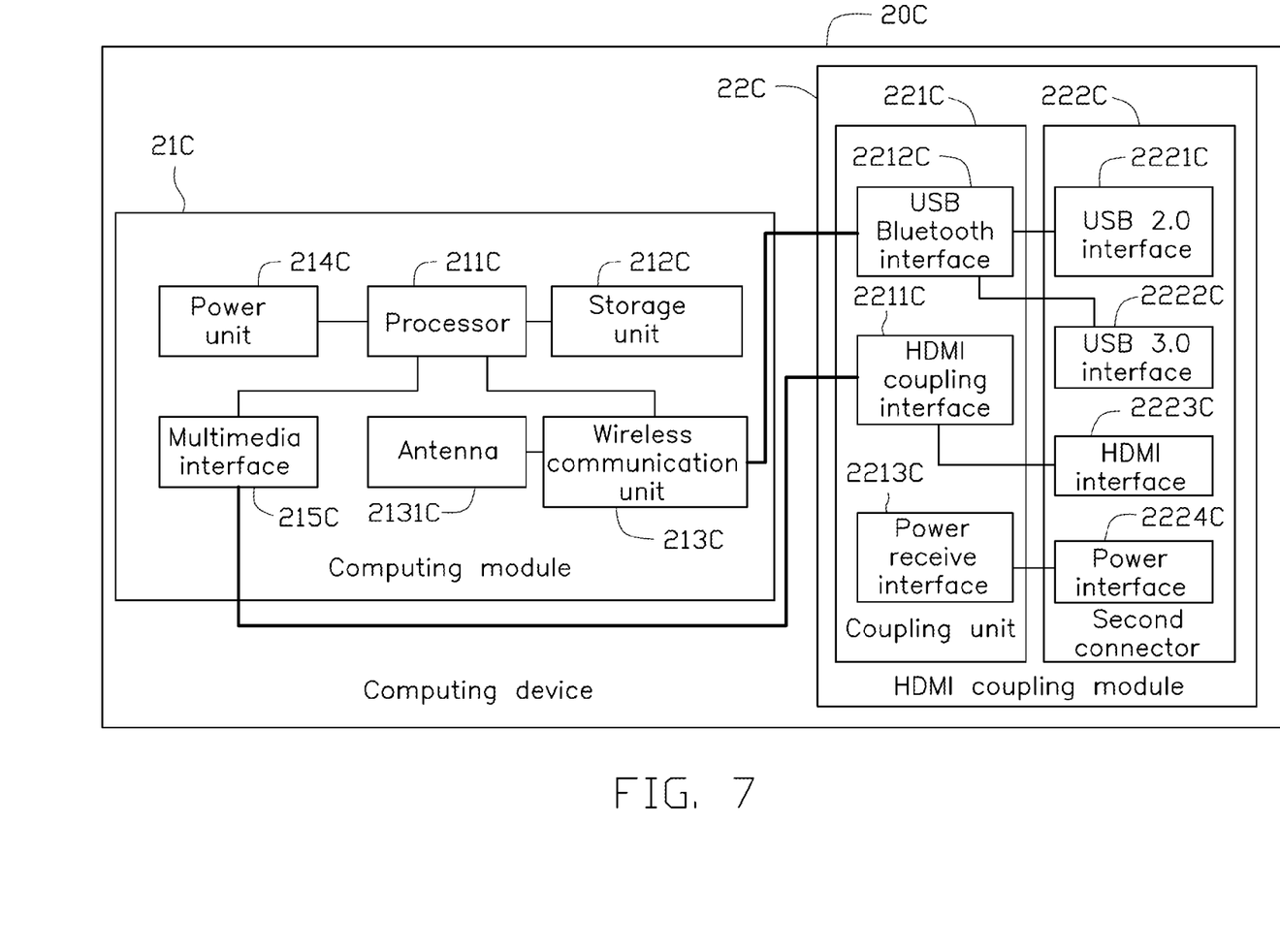

Referring to FIG. 7, the coupling module 22C is a HDMI coupling module corresponding to the computing module 21C with the HDMI multimedia interface 215C. The coupling unit 221C includes a HDMI coupling interface 2211C, a USB Bluetooth interface 2212C, and a power receive interface 2213C. The HDMI coupling interface 2211C is couplable to the HDMI multimedia interface 215C. The USB Bluetooth interface 2212C is couplable to the wireless communication unit 213C. The second connector 222C includes a USB 2.0 interface 2221C, a USB 3.0 interface 2222C, a HDMI interface 2223C, and a power interface 2224C. The USB 2.0 interface 2221C and the USB 3.0 interface 2222C are connected to the USB Bluetooth interface 2212C such that the input device 13A is coupled to the processor 211C in sequence by the USB Bluetooth interface 2212C and the wireless communication unit 213C. The HDMI interface 2223C is connected to the HDMI coupling interface 2211C. The power interface 2224C is connected to the power receive interface 2213C.

Figure 8:
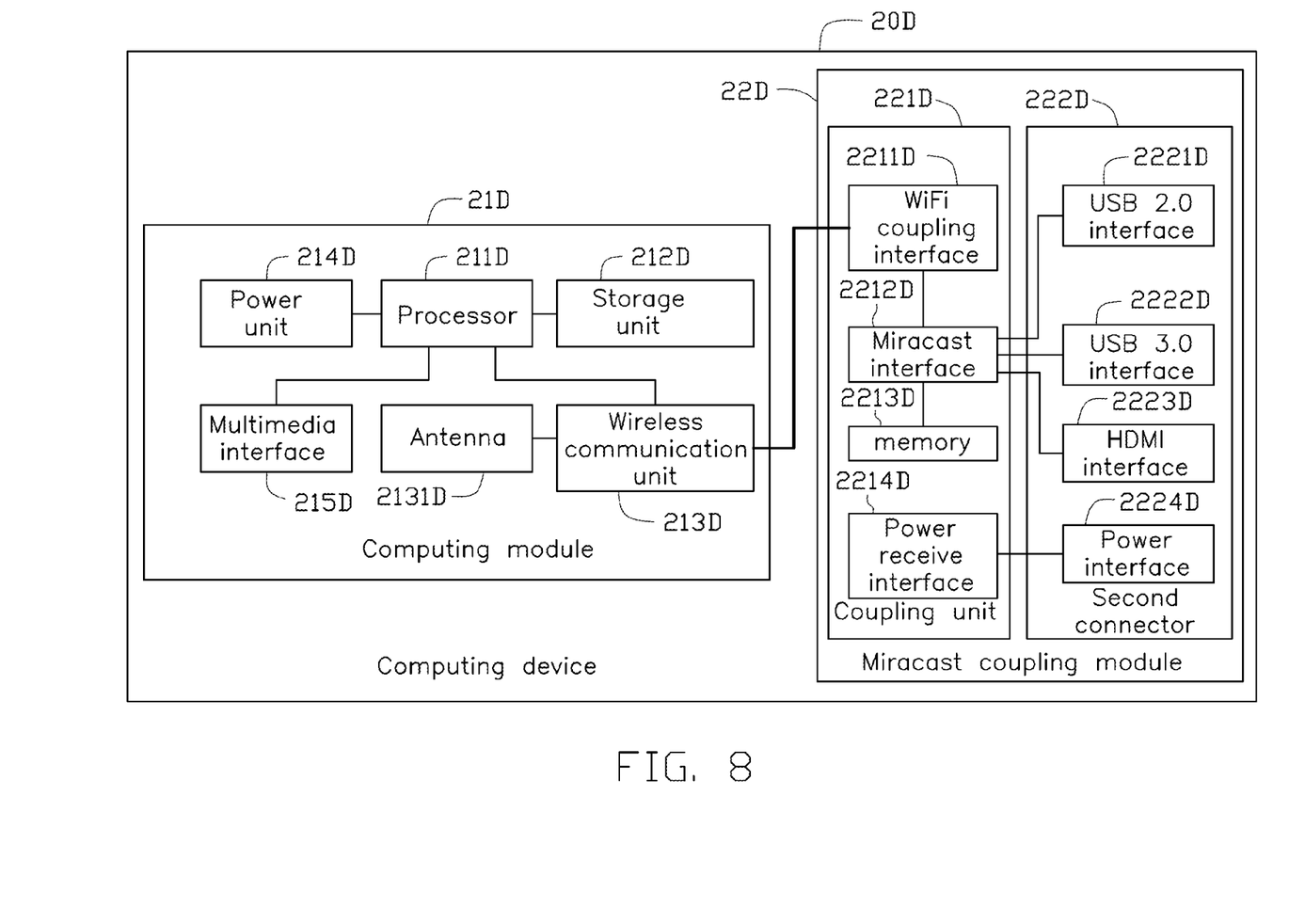

Referring to FIG. 8, the coupling module 22D is a Miracast coupling module corresponding to the computing module 21D with a Miracast multimedia interface 215D. The coupling unit 221D includes a WiFi coupling interface 2211D, a Miracast interface 2212D, a memory 2213D, and a power receive interface 2214D. The Miracast interface 2212D is connected to the WiFi coupling interface 2211D. The memory 2213D, such as RAM or flash memory, is connected to the Miracast interface 2212D. The WiFi coupling interface 2211D is couplable to the wireless communication unit 213D. The second connector 222D includes a USB 2.0 interface 2221D, a USB 3.0 interface 2222D, a HDMI interface 2223D, and a power interface 2224D. The USB 2.0 interface 2221D, the USB 3.0 interface 2222D, and the HDMI interface 2223D are connected to the Miracast interface 2212D such that the input device 13A is coupled to the processor 211D in sequence by the Miracast interface 2212D, the WiFi coupling interface 2211D, and the wireless communication unit 213D. The power interface 2224D is connected to the power receive interface 2214D.

Figure 9:
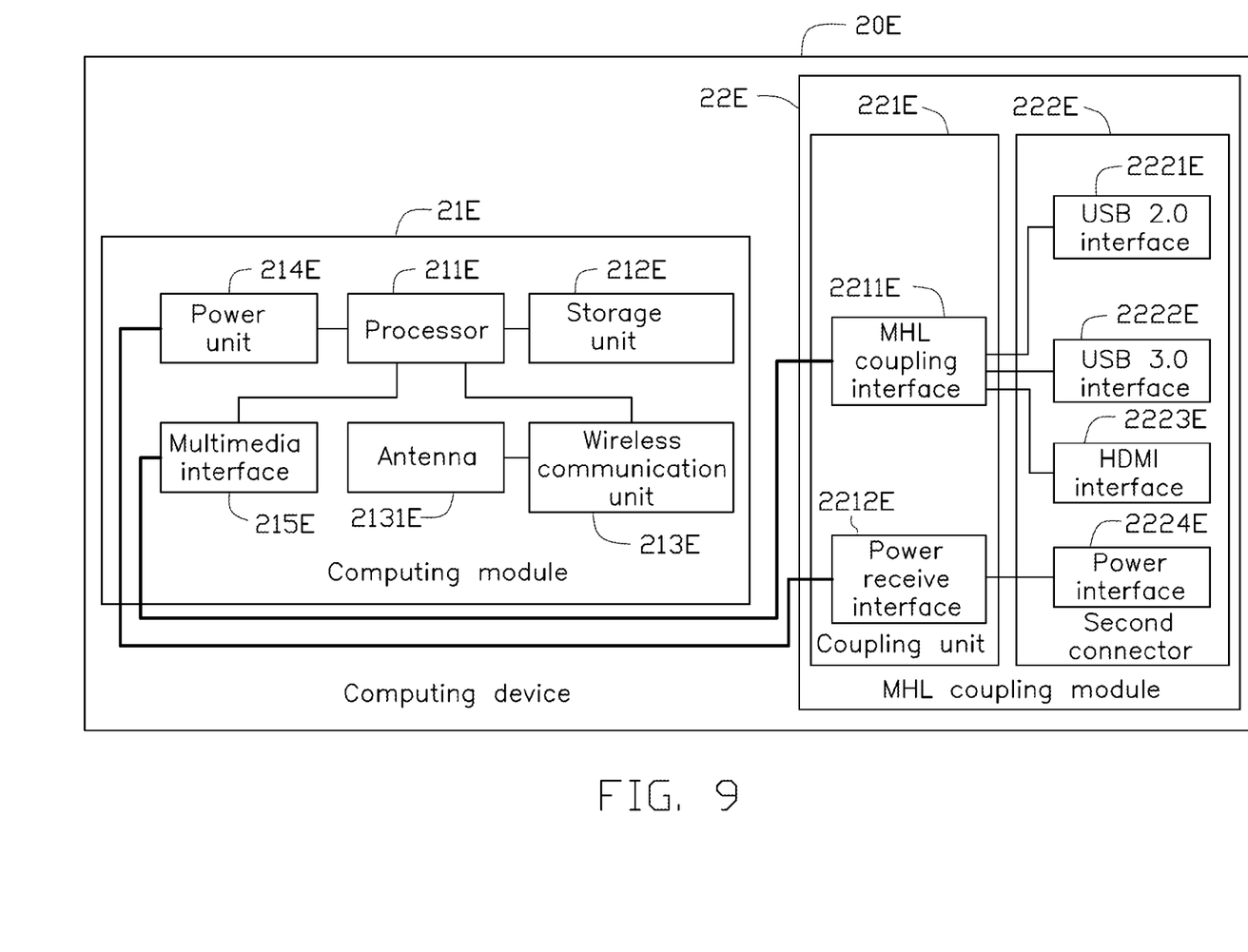

Referring to FIG. 9, the coupling module 22E is a MHL coupling module corresponding to the computing module 21E with the MHL multimedia interface 215E. The coupling unit 221E includes an MHL coupling interface 2211E and a power receive interface 2212E. The MHL coupling interface 2211E is couplable to the MHL multimedia interface 215E. The power receive interface 2212E is couplable to the power unit 214E. The second connector 222E includes a USB 2.0 interface 2221E, a USB 3.0 interface 2222E, a HDMI interface 2223E, and a power interface 2224E. The USB 2.0 interface 2221E, the USB 3.0 interface 2222E, and the HDMI interface 2223E are connected to the MHL coupling interface 2211E such that the input device 13A is coupled to the processor 211E in sequence by the MHL coupling interface 2211E and the MHL multimedia interface 215E. The power interface 2224E is connected to the power receive interface 2212E.

Figure 10:
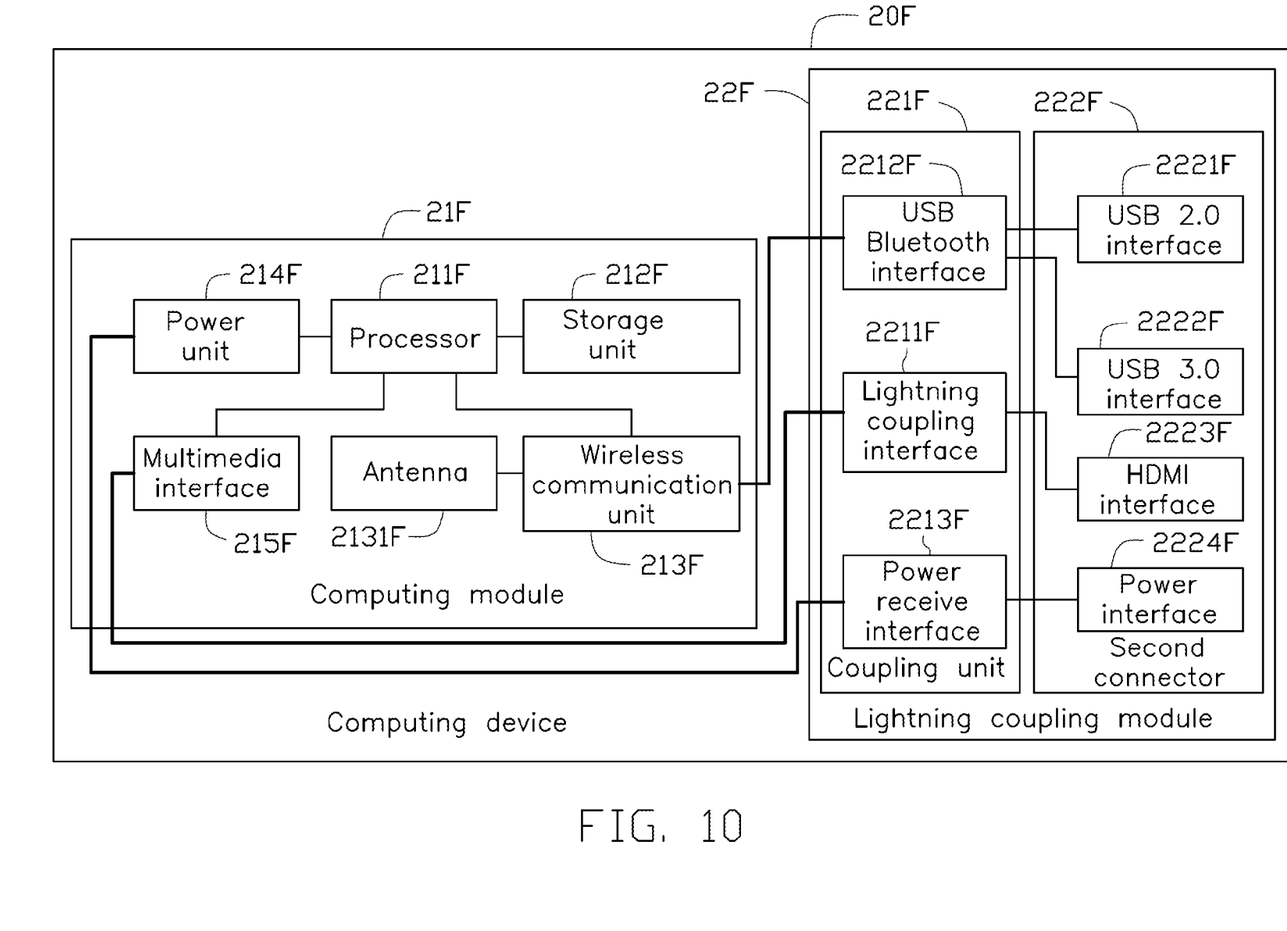

Referring to FIG. 10, the coupling module 22F is a Lightning coupling module corresponding to the computing module 21F with the Lightning multimedia interface 215F. The coupling unit 221F includes a Lightning coupling interface 2211F, a USB Bluetooth interface 2212F, and a power receive interface 2213F. The Lightning coupling interface 2211F is couplable to the Lightning multimedia interface 215F. The USB Bluetooth interface 2212F is couplable to the wireless communication unit 213F. The power receive interface 2213F is couplable to the power unit 214F. The second connector 222F includes a USB 2.0 interface 2221F, a USB 3.0 interface 2222F, a HDMI interface 2223F, and a power interface 2224F. The USB 2.0 interface 2221F and the USB 3.0 interface 2222F are connected to the USB Bluetooth interface 2212F such that the input device 13A is coupled to the processor 211F in sequence by the USB Bluetooth interface 2212F and the wireless communication unit 213F. The HDMI interface 2223F is connected to the Lightning coupling interface 2211F. The power interface 2224F is connected to the power receive interface 2213F.

The exemplary embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to, and including, the full extent established by the broad general meaning of the terms used in the claims. It will therefore be appreciated that the exemplary embodiments described above may be modified within the scope of the claims.

What is claimed is:

1. A computing device configured to transmit content to a docking station for display, the computing device comprising: a second connector, a processor, a storage unit, and a wireless communication unit;
    wherein the second connector, the storage unit, and the wireless communication unit are coupled to the processor, and wherein the second connector is detachably and electrically coupled to a first connector of the docking station;
    wherein the computing device further comprises a computing module and a coupling module, the computing module comprises the processor, the storage unit, the wireless communication unit, a power unit, and a multimedia interface; and the storage unit, the wireless communication unit, the power unit, and the multimedia interface are coupled to the processor; and
    the coupling module is coupled to the computing module and comprises the second connector and a coupling unit, the coupling unit is coupled to the second connector and corresponding to the multimedia interface of the computing module, and the coupling unit and the second connector comprise different types of interfaces.

2. The computing device of claim 1, wherein the second connector is a 40-pin connector.

3. The computing device of claim 1, wherein the second connector includes a USB 2.0 interface, a USB 3.0 interface, a HDMI interface, a power interface, and a thermal sensor.

4. The computing device of claim 1, further comprising heat vents and a memory card slot.

5. The computing device of claim 1,
    wherein the coupling module is a USB Type C coupling module corresponding to the computing module with a USB Type C multimedia interface;
    wherein the coupling unit of the USB Type C coupling module includes a USB Type C coupling interface, a USB Type C switch, and a power receive interface;
    wherein the USB Type C coupling interface is couplable to the USB Type C multimedia interface and the power unit, and wherein the USB Type C switch and the power receive interface are connected to the USB Type C coupling interface;
    wherein the second connector of the USB Type C coupling module includes a USB type C interface, a HDMI interface, and a power interface; and
    wherein the USB type C interface and the HDMI interface are connected to the USB Type C switch such that an input device is coupled to the processor of the computing module in sequence by the USB Type C switch, the USB Type C coupling interface, and the USB Type C multimedia interface, and wherein the power interface is connected to the power receive interface.

6. The computing device of claim 1,
    wherein the coupling module is a HDMI coupling module corresponding to the computing module with a HDMI multimedia interface;
    wherein the coupling unit of the HDMI coupling module includes a HDMI coupling interface, a USB Bluetooth interface, and a power receive interface;
    wherein the HDMI coupling interface is couplable to the HDMI multimedia interface, and wherein the USB Bluetooth interface is couplable to the wireless communication unit;
    wherein the second connector of the HDMI coupling module includes a USB 2.0 interface, a USB 3.0 interface, a HDMI interface, and a power interface; and wherein the USB 2.0 interface and the USB 3.0 interface are connected to the USB Bluetooth interface such that an input device is coupled to the processor of the computing module in sequence by the USB Bluetooth interface and the wireless communication unit, and wherein the HDMI interface is connected to the HDMI coupling interface, and wherein the power interface is connected to the power receive interface.

7. The computing device of claim 1,
wherein the coupling module is a Miracast coupling module corresponding to the computing module with a Miracast multimedia interface;
wherein the coupling unit of the Miracast coupling module includes a WiFi coupling interface, a Miracast interface, a memory, and a power receive interface;
wherein the WiFi coupling interface is couplable to the wireless communication unit, wherein the Miracast interface is connected to the WiFi coupling interface, and wherein the memory is connected to the Miracast interface;
wherein the second connector of the Miracast coupling module includes a USB 2.0 interface, a USB 3.0 interface, a HDMI interface, and a power interface; and
wherein the USB 2.0 interface, the USB 3.0 interface, and the HDMI interface are connected to the Miracast interface such that an input device is coupled to the processor of the computing module in sequence by the Miracast interface, the WiFi coupling interface and the wireless communication unit, and wherein the power interface is connected to the power receive interface.

8. The computing device of claim 1,
wherein the coupling module is a MHL coupling module corresponding to the computing module with an MHL multimedia interface;
wherein the coupling unit of the MHL coupling module includes an MHL coupling interface and a power receive interface, wherein the MHL coupling interface is couplable to the MHL multimedia interface, and wherein the power receive interface is couplable to the power unit;
wherein the second connector of the MHL coupling module includes a USB 2.0 interface, a USB 3.0 interface, a HDMI interface, and a power interface; and
wherein the USB 2.0 interface, the USB 3.0 interface, and the HDMI interface are connected to the MHL coupling interface such that an input device is coupled to the processor of the computing module in sequence by the MHL coupling interface and the MHL multimedia interface, and wherein the power interface is connected to the power receive interface.

9. The computing device of claim 1,
wherein the coupling module is a Lightning coupling module corresponding to the computing module with a Lightning multimedia interface;
wherein the coupling unit of the Lightning coupling module includes a Lightning coupling interface, a USB Bluetooth interface, and a power receive interface;
wherein the Lightning coupling interface is couplable to the Lightning multimedia interface, wherein the USB Bluetooth interface is couplable to the wireless communication unit, and wherein the power receive interface is couplable to the power unit;
wherein the second connector of the Lightning coupling module includes a USB 2.0 interface, a USB 3.0 interface, a HDMI interface, and a power interface; and
wherein the USB 2.0 interface and the USB 3.0 interface are connected to the USB Bluetooth interface such that an input device is coupled to the processor of the computing module in sequence by the USB Bluetooth interface and the wireless communication unit, wherein the HDMI interface is connected to the Lightning coupling interface, and wherein the power interface is connected to the power receive interface.

10. A computing system, comprising:
a docking station having a first connector; and
a computing device, the computing device comprising a second connector, a processor, a storage unit, and a wireless communication unit;
wherein the second connector, the storage unit, and the wireless communication unit are coupled to the processor, and wherein the second connector is detachably and electrically coupled to the first connector of the docking station; and
wherein the computing device is configured to transmit content to the docking station for display by the first and second connectors;
wherein the computing device further comprises a computing module and a coupling module, the computing module comprises the processor, the storage unit, the wireless communication unit, a power unit, and a multimedia interface; and the storage unit, the wireless communication unit, the power unit, and the multimedia interface are coupled to the processor; and
the coupling module is coupled to the computing module and comprises the second connector and a coupling unit, the coupling unit is coupled to the second connector and corresponding to the multimedia interface of the computing module, and the coupling unit and the second connector comprise different types of interfaces.

11. The computing system of claim 10, wherein the first and second connectors are 40-pin connectors.

12. The computing system of claim 10, wherein the second connector includes a USB 2.0 interface, a USB 3.0 interface, a HDMI interface, a power interface, and a thermal sensor.

13. The computing system of claim 12, wherein the docking station further comprises a slot and the computing device is inserted into the slot to be coupled to the docking station.

14. The computing system of claim 13, wherein the docking station is a notebook-like device.

15. The computing system of claim 13, wherein the docking station is an electronic display device.

16. The computing system of claim 10, wherein the computing device further comprises heat vents and a memory card slot.

17. The computing system of claim 10,
wherein the docking station further includes a USB hub, an input device, a HDMI converter, a display, a speaker and a power module, wherein the USB hub is connected to the first connector, wherein the input device is connected to the USB hub, wherein the HDMI converter is connected to the first connector, wherein the display and the speaker are connected to the HDMI converter, wherein the HDMI converter is configured to convert the HDMI signals from the first connector to video signals to the display and audio signals to the speaker, and wherein the power module is connected to the first connector.

18. The computing system of claim 17, wherein the docking station further comprises a slot and the coupling module is inserted into the slot to be coupled to the docking station.

19. The computing system of claim 18, wherein the docking station is a notebook-like device.

\* \* \* \* \*